(12) United States Patent  
Ilchenko

(10) Patent No.: US 7,356,214 B2
(45) Date of Patent: Apr. 8, 2008

(54) OPTICAL WAVEGUIDE COUPLER FOR WHISPERING-GALLERY-MODE RESONATORS

(75) Inventor: Vladimir Ilchenko, Arcadia, CA (US)

(73) Assignee: OEwaves, Inc., Pasadena, CA (US)

( * ) Notice: Subject to any disclaimer, the term of this patent is extended or adjusted under 35 U.S.C. 154(b) by 0 days.

(21) Appl. No.: 11/087,382

(22) Filed: Mar. 22, 2005

(65) Prior Publication Data
US 2005/0220411 A1    Oct. 6, 2005

Related U.S. Application Data

(60) Provisional application No. 60/555,348, filed on Mar. 22, 2004.

(51) Int. Cl.
*G02B 6/26* (2006.01)
*G02F 1/03* (2006.01)

(52) U.S. Cl. ......................... 385/15; 359/245

(58) Field of Classification Search .................... None
See application file for complete search history.

(56) References Cited

U.S. PATENT DOCUMENTS

| | | | |
|---|---|---|---|
| 5,204,640 A | 4/1993 | Logan | |
| 5,220,292 A | 6/1993 | Bianchini et al. | |
| 5,723,856 A | 3/1998 | Yao et al. | |
| 5,751,747 A | 5/1998 | Lutes et al. | |
| 5,777,778 A | 7/1998 | Yao | |
| 5,917,179 A | 6/1999 | Yao | |
| 5,929,430 A | 7/1999 | Yao et al. | |
| 5,985,166 A | 11/1999 | Unger et al. | |
| 6,080,586 A | 6/2000 | Baldeschwieler et al. | |
| 6,178,036 B1 | 1/2001 | Yao | |
| 6,203,660 B1 | 3/2001 | Unger et al. | |
| 6,389,197 B1 | 5/2002 | Iltchenko et al. | |
| 6,417,957 B1 | 7/2002 | Yao | |
| 6,473,218 B1 | 10/2002 | Maleki et al. | |
| 6,476,959 B2 | 11/2002 | Yao | |
| 6,487,233 B2 | 11/2002 | Maleki et al. | |
| 6,488,861 B2 | 12/2002 | Iltchenko et al. | |
| 6,490,039 B2 | 12/2002 | Maleki et al. | |
| 6,535,328 B2 | 3/2003 | Yao | |
| 6,567,436 B1 | 5/2003 | Yao et al. | |
| 6,580,532 B1 | 6/2003 | Yao et al. | |
| 6,594,061 B2 | 7/2003 | Huang et al. | |
| 6,762,869 B2 | 7/2004 | Maleki et al. | |
| 6,795,481 B2 | 9/2004 | Maleki et al. | |
| 6,798,947 B2 | 9/2004 | Iltchenko | |
| 6,853,479 B1 | 2/2005 | Ilchenko et al. | |

(Continued)

FOREIGN PATENT DOCUMENTS

WO    2005055412    6/2005

OTHER PUBLICATIONS

Logan, et al.; Stabilization of Oscillator Phase Using a Fiber-Optic Delay-Line; 1991; 45th Annual Symposium on Frequency Control; pp. 508-512.

(Continued)

*Primary Examiner*—Sung Pak
*Assistant Examiner*—Hoang Tran
(74) *Attorney, Agent, or Firm*—Fish & Richardson P.C.

(57) ABSTRACT

This application describes whispering gallery modes resonators made of electro-optic materials that are optically coupled to one or two waveguide couplers.

19 Claims, 13 Drawing Sheets

U.S. PATENT DOCUMENTS

| | | | |
|---|---|---|---|
| 6,871,025 | B2 | 3/2005 | Maleki et al. |
| 6,873,631 | B2 | 3/2005 | Yao et al. |
| 6,879,752 | B1 | 4/2005 | Ilchenko et al. |
| 6,901,189 | B1 | 5/2005 | Savchenkov et al. |
| 7,092,591 | B2 * | 8/2006 | Savchenkov et al. ......... 385/15 |
| 2002/0018617 | A1 * | 2/2002 | Iltchenko et al. .............. 385/28 |
| 2002/0081055 | A1 * | 6/2002 | Painter et al. .................. 385/2 |
| 2004/0100675 | A1 * | 5/2004 | Matsko et al. ............... 359/245 |
| 2004/0218880 | A1 | 11/2004 | Matsko et al. |
| 2004/0240781 | A1 | 12/2004 | Savchenckov et al. |
| 2005/0017816 | A1 | 1/2005 | Ilchenko et al. |
| 2005/0074200 | A1 | 4/2005 | Savchenkov et al. |
| 2005/0123306 | A1 | 6/2005 | Ilchenko et al. |
| 2005/0128566 | A1 | 6/2005 | Savchenkov et al. |

OTHER PUBLICATIONS

L.E. Myers, et al.; Quasi-phase-matched optical parametric oscillators in bulk periodically poled $LiNbO_3$; Nov. 1995; J.Opt. Soc. Am. B/vol. 12, No. 11; pp. 2102-2116.

X. Steve Yao, et al.; Converting Light into Spectrally Pure Microwave Oscillation; Apr. 1996; Optics Letters, vol. 21, No. 7; pp. 483-485.

H. Ito, et al.; InP/InGaAs uni-travelling-carrier photodiode with 310 GHz receiver; Oct. 12, 2000; Electronics Letters, vol. 36, No. 21; pp. 1809-1810.

V. Ilchenko, et al.; Sub-Micro Watt Photonic Microwave Receiver; Nov. 2002; IEEE Photonics Technology Letters, vol. 14, No. 11; pp. 1602-1604.

* cited by examiner

Direct Coupling: Configuration 1

Direct Coupling: Configuration 2

Angled Coupling Via Angled WG Facet

FIG. 13
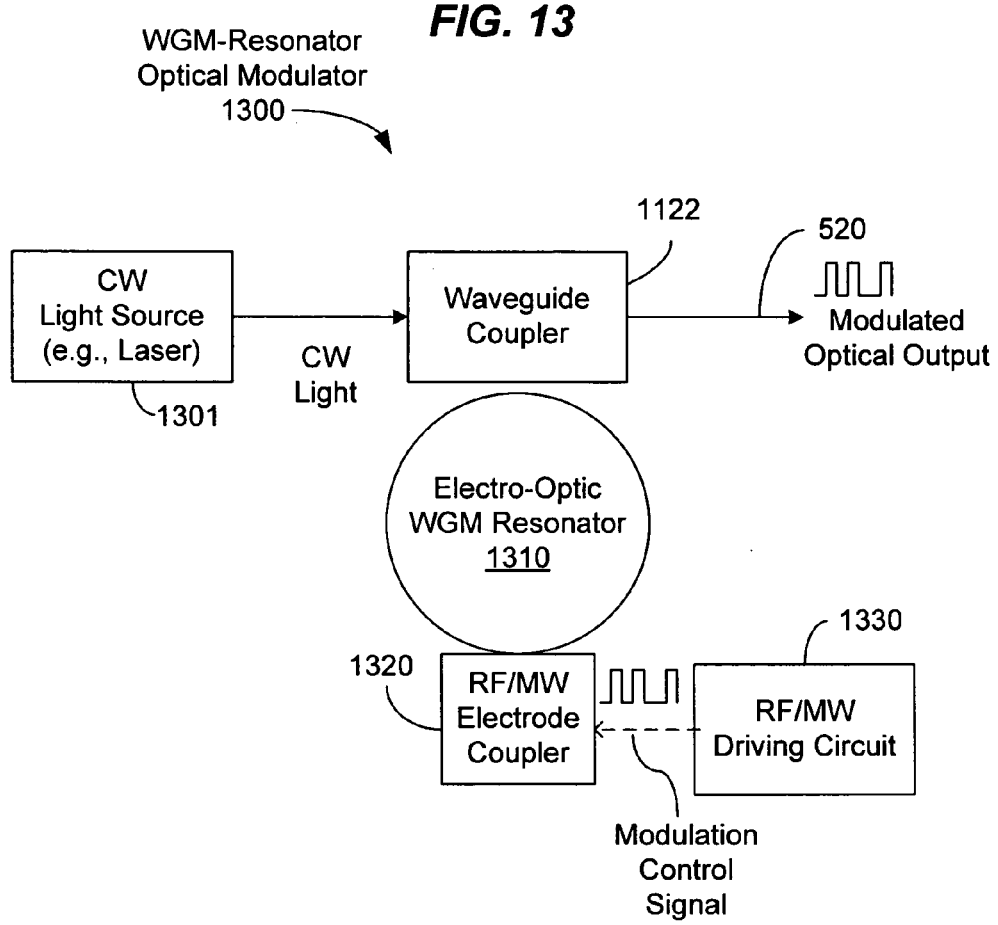
FIG. 14A     FIG. 14B
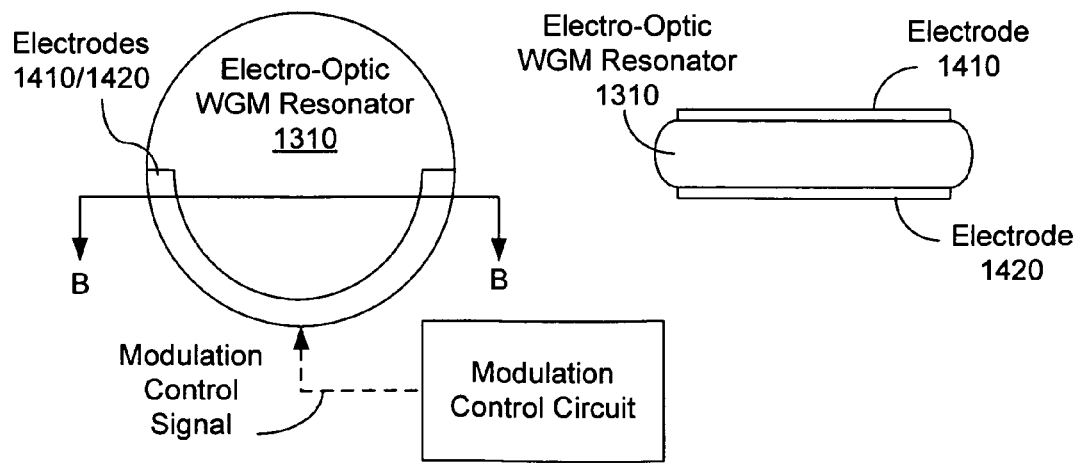

Actively Mode-Locked Laser 1700

1800 Tunable WGM-Resonator Optical Filter

OPTICAL WAVEGUIDE COUPLER FOR WHISPERING-GALLERY-MODE RESONATORS

This application claims the benefit of U.S. Provisional Patent Application Nos. 60/555,348 entitled "Coupling devices for tunable lithium niobate optical resonators" and filed Mar. 22, 2004, the entire disclosure of which is incorporated herein by reference as part of the specification of this application.

BACKGROUND

This application relates to optical whispering gallery mode (WGM) resonators and applications of such resonators.

Optical resonators may be used to spatially confine resonant optical energy in a limited cavity with a low optical loss. The resonance of an optical resonator may be used to provide various useful functions such as optical filtering, optical modulation, optical amplification, optical delay, and others. Light can be coupled into or out of optical resonators via various coupling mechanisms according to the configurations of the resonators. For example, Fabry-Perot optical resonators with two reflectors at two terminals may use partial optical transmission of at least one reflector to receive or export light.

WGM resonators confine light in a whispering gallery mode that is totally reflected within a closed circular optical path. Unlike Fabry-Perot resonators, light in WGM resonators cannot exit the resonators by optical transmission. Light in a WGM resonator "leaks" out of the exterior surface of the closed circular optical path of a WGM resonator via the evanescence field of the WG mode. An optical coupler can be used to couple light into or out of the WGM resonator via this evanescent field.

SUMMARY

This application describes, among others, techniques and devices for efficient coupling of light between a WGM resonator and a waveguide. In one implementation, a method is described to provide an optical resonator formed of an electro-optic material with a crystal axis perpendicular to a plane in which a whispering gallery mode of the optical resonator circulates and to use a waveguide, which is also formed of the electro-optic material, to effectuate a refractive index of guided light to be equal to or greater than a refractive index for the whispering gallery mode in the optical resonator to provide coupling between the optical resonator and the waveguide. In another implementation, a device is described to include at least an optical resonator formed of an electro-optic material and shaped to support a whispering gallery mode circulating in a plane that is perpendicular to a crystal axis of the electro-optic material, and a waveguide formed of the electro-optic material having a crystal axis perpendicular to a longitudinal direction of the waveguide and parallel to the crystal axis of the optical resonator, the waveguide located close to the resonator to evanescently couple with the optical resonator. In yet another implementation, a device is described to include at least an optical resonator formed of an electro-optic material and shaped to support a whispering gallery mode circulating in a plane that is perpendicular to a crystal axis of the electro-optic material, and a waveguide formed of the electro-optic material having a crystal axis perpendicular to a longitudinal direction of the waveguide and perpendicular to the crystal axis of the optical resonator, the waveguide having an angled facet at a first end which is located close to the resonator to evanescently couple with the optical resonator.

This application further describes opto-electronic oscillators, electro-optic modulators, actively mode-locked lasers, optical frequency comb generators, and tunable optical filters that use a WGM resonator optically coupled to a waveguide.

These and other implementations are described in detail in the attached drawings, the detailed description, and the claims.

BRIEF DESCRIPTION OF DRAWINGS

FIGS. 13, 14A, and 14B illustrate an example of an electro-optic modulator that uses a WGM resonator formed in an electro-optic material and a waveguide coupler to modulate light.

DETAILED DESCRIPTION

Figure 1:
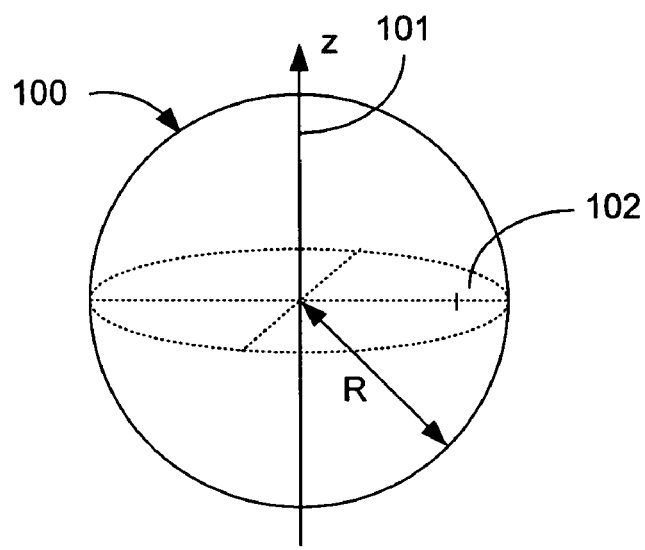
FIGS. 1, 2, 3, 4A, and 4B illustrate examples of WGM resonators in different configurations.

The techniques and devices described in this application include, among others, efficient coupling of light between a waveguide and a WGM resonator with a refractive index that ether matches the index of the waveguide or is less than a refractive index of the waveguide. When the indices of the WGM resonator and the waveguide substantially match, the coupling may be effectuated by directly coupling the WGM resonator to the waveguide by spatially placing the WGM resonator close to the waveguide to overlap their evanescent fields. This direct coupling can be achieved without using any special coupling feature such as an angle-polished facet on the waveguide. When the index of the WGM resonator is less than the refractive index of the waveguide and thus there is no index matching, the waveguide may be shaped to include an angled facet which provides the proper evanescent coupling between the WGM resonator and the waveguide. In anisotropic optical materials, the indices of the WGM resonator and the waveguide vary with the polarization of light so that the optic axes of the WGM resonator and the waveguide may be controlled to satisfy conditions for direct coupling or coupling via an angled facet of the waveguide.

In various applications that use high-Q optical resonators with whispering-gallery-modes, the WGM resonators may be made of an optically anisotropic material such as an electro-optic crystal with a high index of refraction (n) greater than 2. Lithium niobate is an example of such a material. A proper coupling mechanism between the WGM resonator and the waveguide is provided to ensure effective energy exchange between the resonator mode and the propagating mode in the waveguide. Two main conditions of the effective coupling are 1) a sufficient mode overlap between a propagation mode of the waveguide and a resonator mode and 2) phase synchronism between the evanescent waves in the resonator and the waveguide. The first condition can be achieved with high-Q resonators when the input beam guided by the waveguide is sufficiently small (e.g., 10 micron or less) or when the WGM resonator and the waveguide are sufficiently close to provide the spatial overlap of their modes. The second condition, phase synchronism, requires that the phase velocity of the wave in the waveguide be matched with that of the whispering-gallery mode that circulates in the resonator. This phase matching condition can be achieved directly by tailoring the waveguide properties (index or transverse geometry) when the resonator is put adjacent to a regular straight waveguide. As a result, effective refraction indexes for the waveguide and resonator are made equal. This phase matching is similar to the phase matching by use of, e.g., a fiber taper coupler for whispering gallery modes in silica resonators. Alternatively, if the index of the waveguide is higher than that of the WGM resonator, an angle-polished facet may be formed on the waveguide with an angle determined by the indices of the resonator and the waveguide to effectuate the efficient coupling. The polished angle is determined by arcsin $(n_{resonator}/n_{waveguide})$.

When the WGM resonator is made of a high-index material such as electro-optic materials with indices greater than 2, regular telecom fibers made of pure or doped silica glass prisms with a refractive index ranging from 1.5 to 1.7 are inadequate to provide the proper coupling via direct coupling or angle-polished facet coupling. The electro-optic material lithium niobate has a refractive index between about 2.05 and 2.2 depending on the resonator diameter and mode polarization, and therefore direct fiber coupling for application is not possible. The prism coupling method is applicable for coupling light into lithium niobate resonators but requires expensive high-index materials for coupling prisms and additionally collimators and lenses for coupling light from the coupling prism to optical fibers. The present waveguide coupling may be used for lithium niobate resonators using the industry-standard lithium niobate integrated waveguides which may be used in phase and amplitude modulators and other integrated-optic circuits. Such lithium niobate waveguides can be produced by ion-exchange implantation of metal doping that elevates locally the refraction index in several-micrometer cross-section channels next to the surface of lithium niobate wafers. Standard butt-coupling methods may be used to launch light into these waveguides from fibers such as standard telecom fibers with minimal loss.

Because of the optical anisotropy, lithium niobate resonators have different modal effective indices of refraction, depending on the orientation of the electrical field of the coupled light. The WGM resonators made of lithium niobate use z-cut crystals where the crystal axis is perpendicular to the plane in which the WG modes circulate. TM modes are characterized by orientation of electrical field parallel to the plane of the resonator in which the WG modes circulate. The effective index for TM modes is close to 2.2 in lithium niobate, and therefore the resonator can also be directly coupled to the corresponding polarization modes in X-cut wafer waveguides. TE modes in the resonator, perpendicular to TM modes, have effective index close to 2.14, and therefore can also be directly coupled to the corresponding polarization modes in X-cut wafer waveguides. Alternatively, TE modes can be effectively coupled to angle-polished waveguides in Z-cut wafer waveguides.

The following sections first describe examples of suitable WGM resonator geometries and then specific coupling designs for coupling between a waveguide and a WGM resonator.

Figure 2:
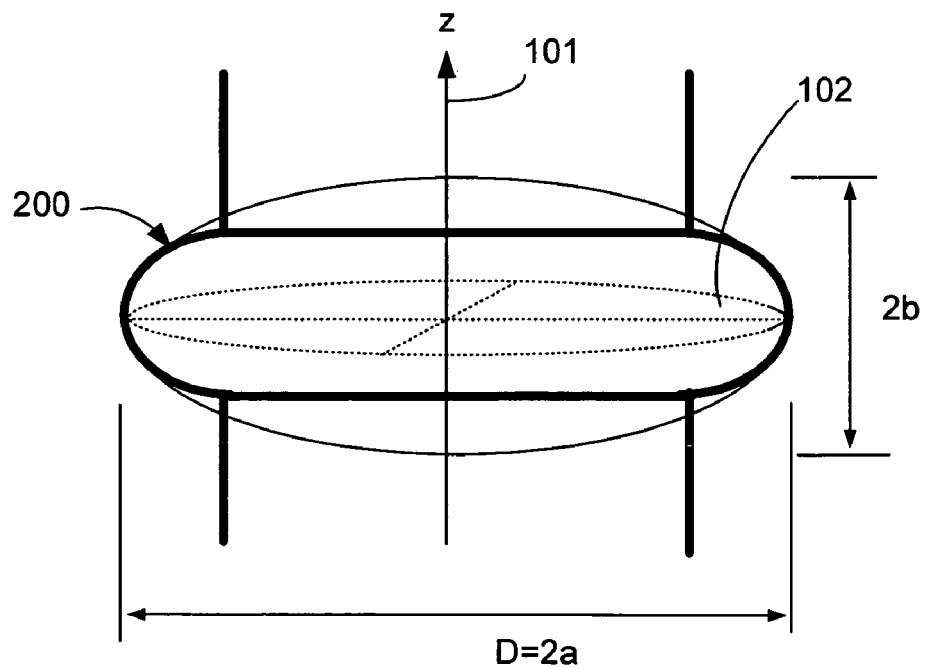
Figure 3:
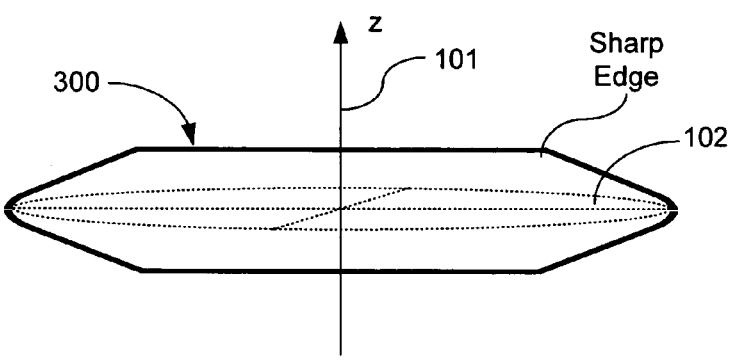

WGM resonators suitable for implementing the waveguide coupling designs may be made in different geometries. Such WGM resonators support a circular optical path with exterior curved surfaces to spatially confine the modes in the direction perpendicular to the plane in which the circular optical path is located. FIGS. 1, 2, and 3 illustrate three exemplary geometries for implementing WGM resonators.

FIG. 1 shows a spherical WGM resonator 100 which is a solid dielectric sphere. The sphere 100 has an equator in the plane 102 which is symmetric around the z axis 101. A WG mode exists around the equator within the spherical exterior surface and circulates within the resonator 100. The spherical curvature of the exterior surface around the equator plane 102 provides spatial confinement along both the z direction and its perpendicular direction to support the WG modes. The eccentricity of the sphere 100 generally is low.

FIG. 2 shows an exemplary spheroidal microresonator 200. This resonator 200 may be formed by revolving an ellipse (with axial lengths a and b) around the symmetric axis along the short elliptical axis 101 (z). The eccentricity of resonator 100 is $(1-b^2/a^2)^{1/2}$ and is generally high, e.g., greater than $10^{-1}$. Hence, the exterior surface is the resonator 200 is not part of a sphere and provides more spatial confinement on the modes along the z direction than a spherical exterior. The equator plane 102 at the center of the resonator 200 is perpendicular to the axis 101 (z) and the WG modes circulate near the circumference of the plane 102 within the resonator 200.

FIG. 3 shows another exemplary WGM resonator 300 which has a non-spherical exterior where the exterior profile is a general conic shape which can be mathematically represented by a quadratic equation of the Cartesian coordinates. Similar to the geometries in FIGS. 1 and 2, the exterior surface provides curvatures in both the direction in the plane 102 and the direction of z perpendicular to the plane 102 to confine and support the WG modes. Such a non-spherical, non-elliptical surface may be, among others, a parabola or hyperbola.

The above three exemplary geometries in FIGS. 1, 2, and 3 share a common geometrical feature that they are all axially or cylindrically symmetric around the axis 101 (z) around which the WG modes circulate in the plane 102. The curved exterior surface is smooth around the plane 102 and provides two-dimensional confinement around the plane 102 to support the WG modes.

Notably, the spatial extent of the WG modes in each resonator along the z direction 101 is limited above and below the plane 102 and hence it may not be necessary to have the entirety of the sphere 100, the spheroid 200, or the conical shape 300. Instead, only a portion of the entire shape around the plane 102 that is sufficiently large to support the whispering gallery modes may be used to for the WGM resonator. For example, rings, disks and other geometries formed from a proper section of a sphere may be used as a spherical WGM resonator.

Figure 4A:
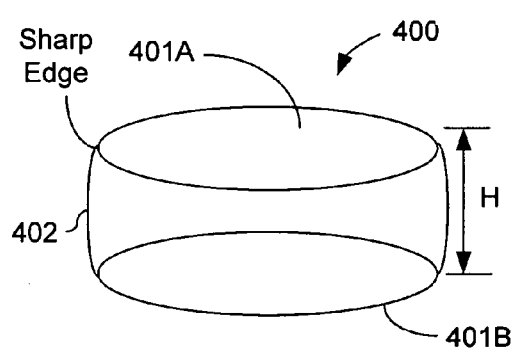
Figure 4B:
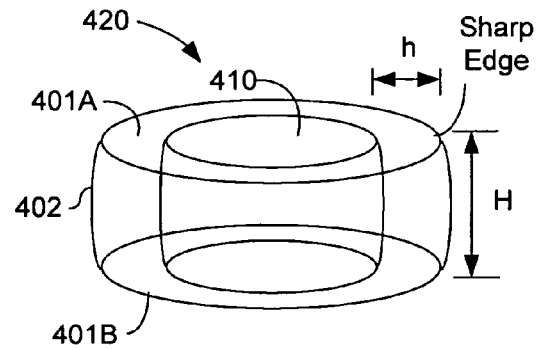

FIGS. 4A and 4B show a disk-shaped WGM resonator 400 and a ring-shaped WGM resonator 420, respectively. In FIG. 4A, the solid disk 400 has a top surface 401A above the center plane 102 and a bottom surface 401B below the plane 102 with a distance H. The value of the distance H is sufficiently large to support the WG modes. Beyond this sufficient distance above the center plane 102, the resonator may have sharp edges. The exterior curved surface 402 can be selected from any of the shapes shown in FIGS. 1, 2, and 3 to achieve desired WG modes and spectral properties. The ring resonator 420 in FIG. 4B may be formed by removing a center portion 410 from the solid disk 400 in FIG. 4A. Since the WG modes are present near the exterior part of the ring 420 near the exterior surface 402, the thickness h of the ring may be set to be sufficiently large to support the WG modes.

Anisotropic materials such as lithium niobate, when used to construct a WGM resonator, may be oriented to place the crystal axis along the z direction ("z-cut"). Depending on the polarization of light in a WG mode in the resonator, the waveguide coupled to the WGM resonator may be either a z-cut waveguide or a x-cut waveguide whose crystal axis is perpendicular to the z direction shown in FIGS. 1-3, 4A and 4B. The refractive index of the waveguide is less or equal to the index of the resonator for a selected WGM with a selected polarization.

Figure 5:
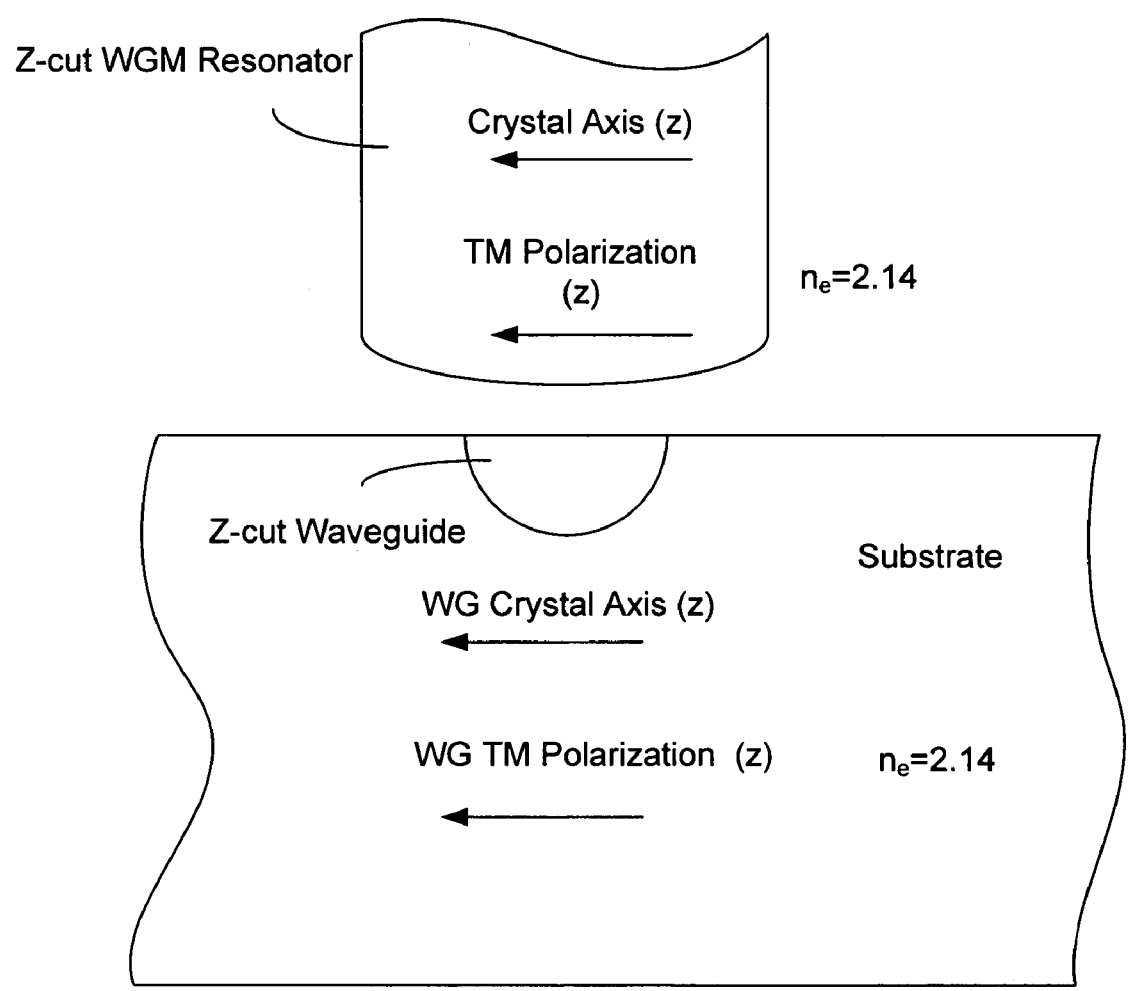
FIGS. 5, 6, and 7 show waveguide coupler configurations as examples.
Figure 6:
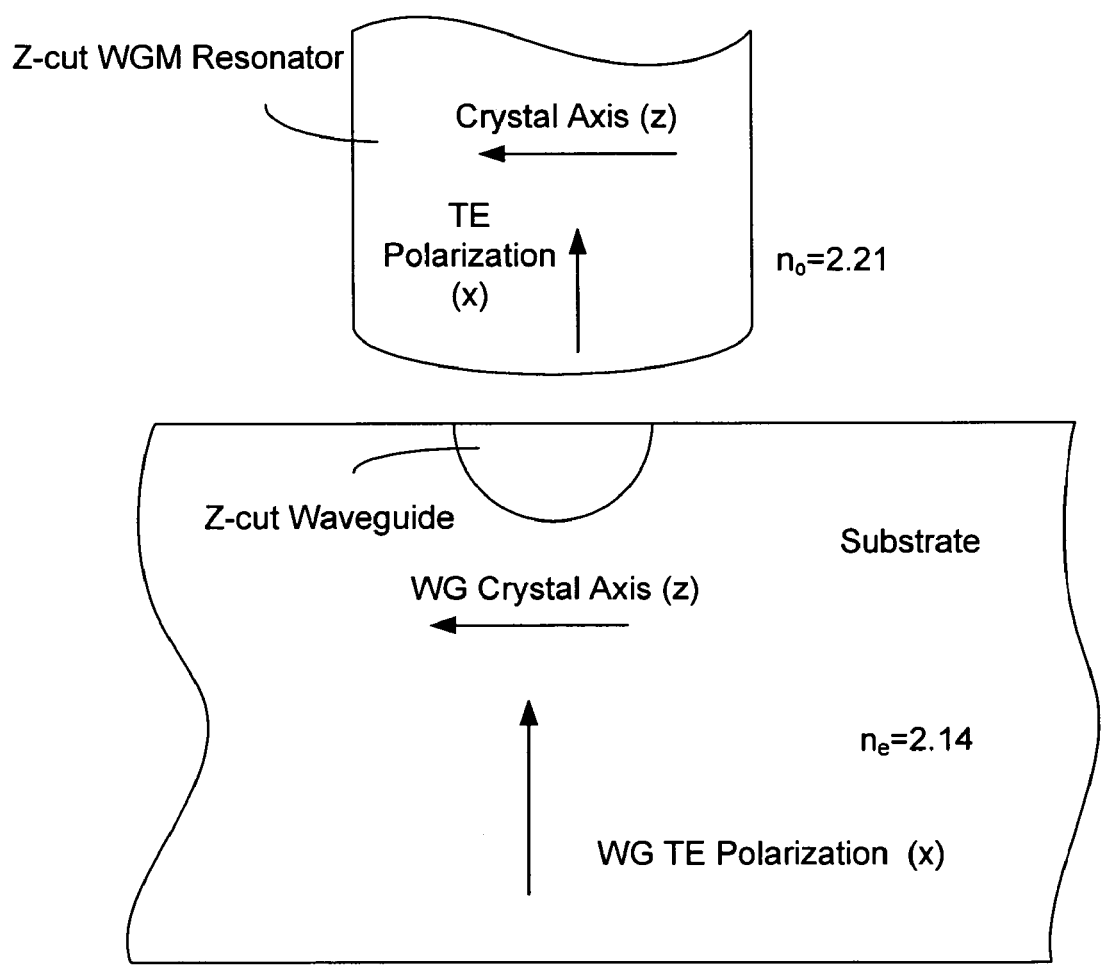
Figure 7:
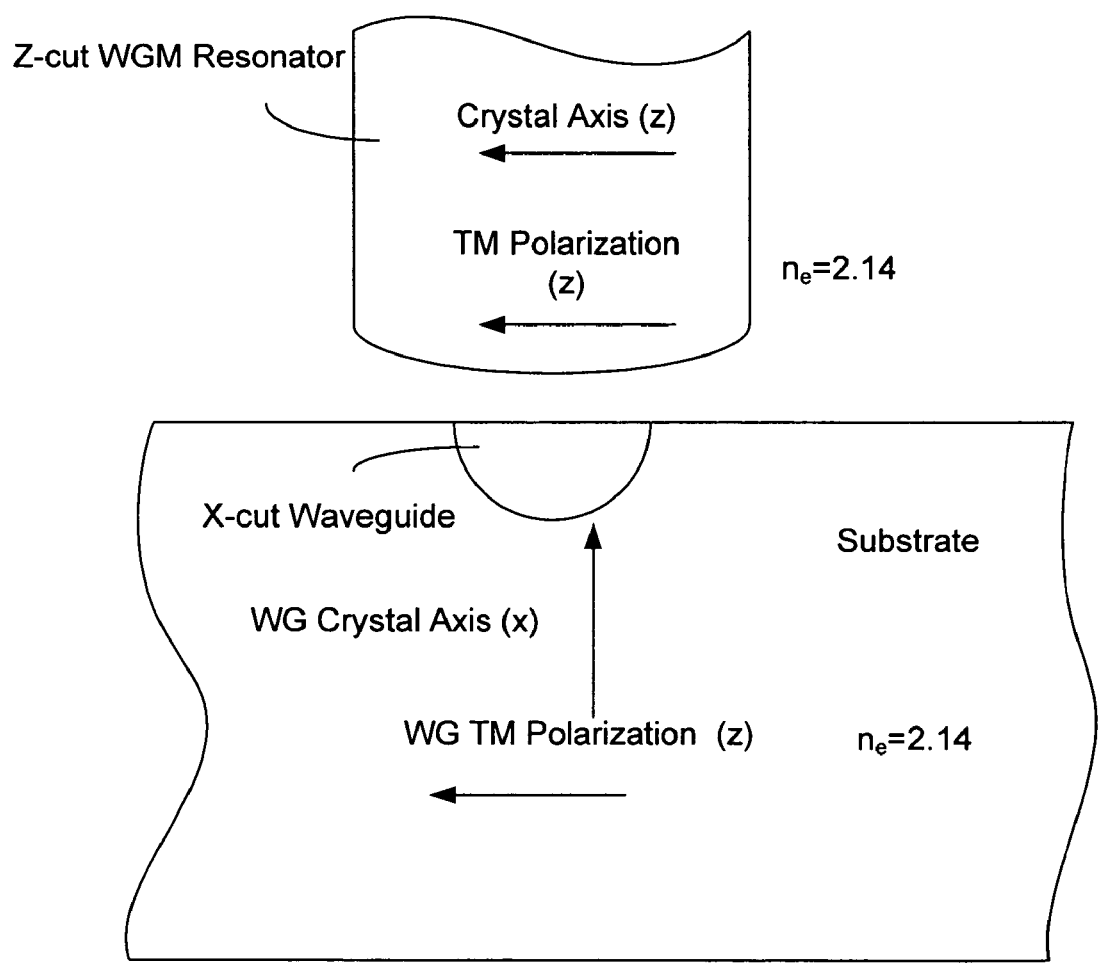

FIGS. 5, 6, and 7 illustrate three different waveguide coupling configurations. In FIG. 5, a waveguide made of an anistropic crystal and formed on a substrate has its crystal axis to be in the z direction which is perpendicular to the longitudinal direction of the waveguide. Assume both the resonator and the waveguide are made of lithium niobate. For a guided mode in a z-polarization in the waveguide and a WGM mode in the z-polarization in the resonator, the index of the resonator is equal to the index of the waveguide, i.e., n =2.14 (extraordinary ray). Because the indices match, the waveguide can be directly coupled to the resonator via spatial overlap of the evanescent fields. Accordingly, the coupling can be achieved by simply placing the resonator close to the waveguide within the reach of the evanescent fields. No angled facet is needed in this coupling configuration. FIG. 6 shows that, for the same crystal orientations as in FIG. 5, when the optical polarization is perpendicular to the polarization in FIG. 5, the indices for the resonator and the waveguide still match but at a different value of n=2.21 for the ordinary wave. Once again, the same direct coupling configuration as shown in FIG. 5 can be used.

In FIG. 7 where the crystal axis of the waveguide (x-cut) is perpendicular to the crystal axis of the resonator, for light with polarization in the z direction, the effective index of the waveguide is n=2.21 (ordinary wave) and the effective index of the resonator is 2.14 (extraordinary wave). Under this condition, the direct coupling shown in FIGS. 5 and 6 no longer provides the phase matching or synchronism between the resonator and the waveguide. Accordingly, the waveguide is shaped to have an angled facet given by arcsin (2.14/2.21)=75.5 degrees in order to provide the proper phase matching.

Figure 8:
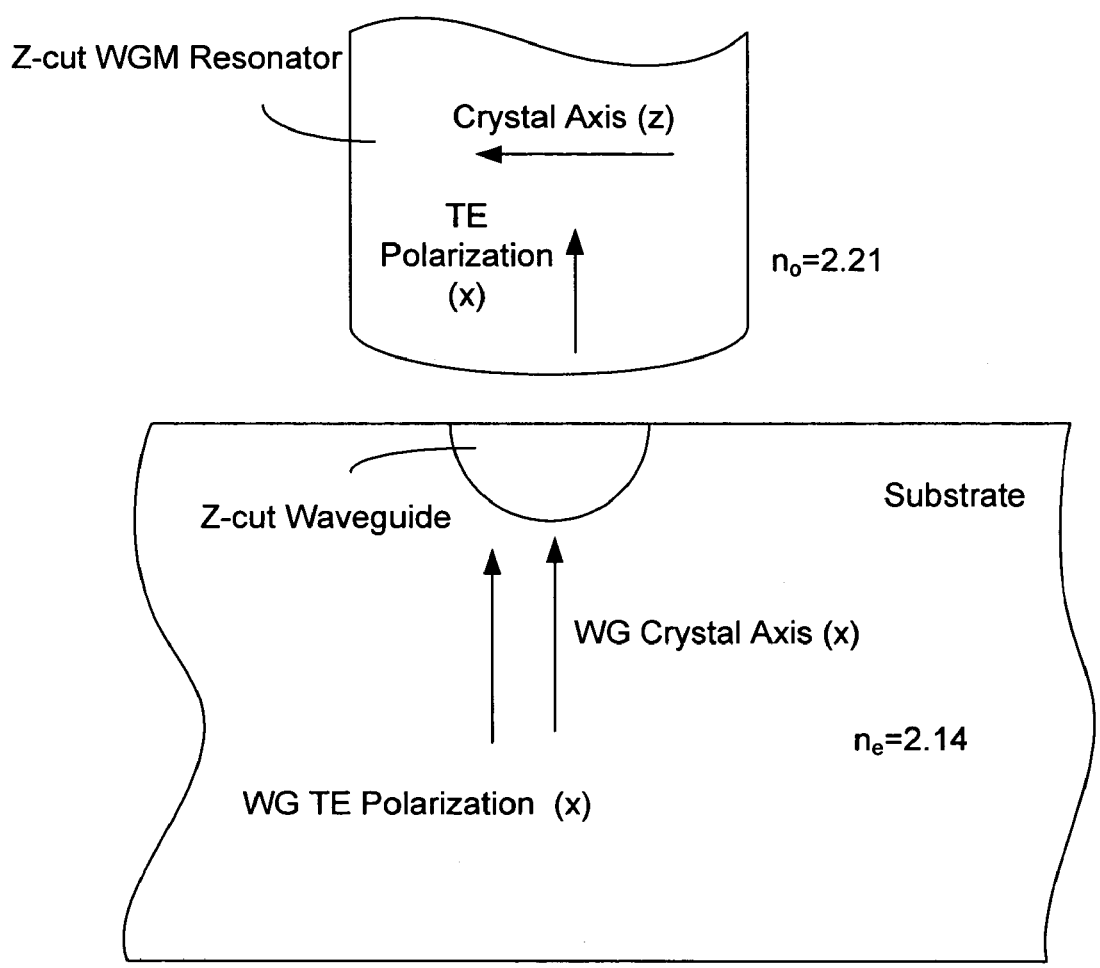
FIG. 8 shows a waveguide coupler configuration that is less efficient in coupling via direct side coupling or angled facet coupling.

If the polarization of light is perpendicular to the crystal axis of the resonator as shown in FIG. 8, the index of the waveguide (at 2.14 for lithium niobate) is less than that of the resonator. Accordingly, no efficient coupling can be achieved by either the direct coupling in FIGS. 5 and 6 and the angled facet coupling in FIG. 7.

Figure 9:
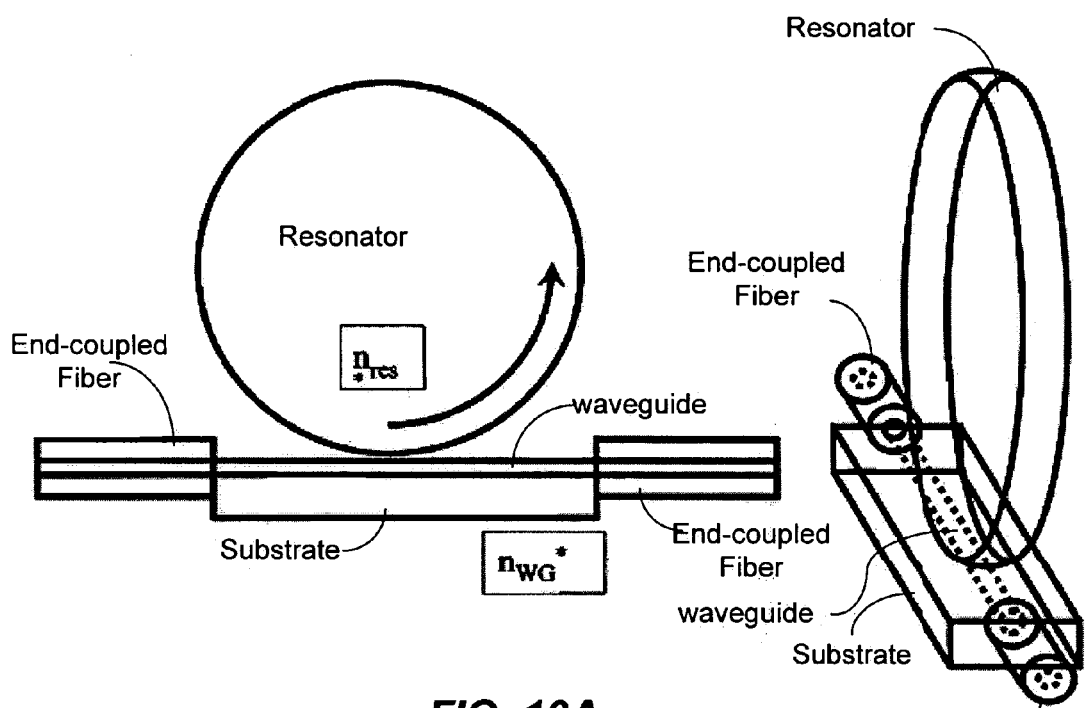
FIGS. 9, 10A, 10B, and 10C show implementations of the waveguide coupler configurations in FIGS. 5, 6 and 7 that couple one or two fibers to the waveguide coupler.

FIG. 9 further shows the direct coupling design in FIGS. 5 and 6 where two end-coupled fibers are coupled to two ends of the waveguide in direct coupling with the resonator. Each fiber can be engaged to an end facet of the waveguide via various methods. This design provides input and output for the resonator via fibers where the waveguide coupler on the substrate 1 may be the input coupler to couple input light into the resonator and the waveguide coupler on the substrate 2 may be the output coupler to couple light out of the resonator. One of the applications of this design is to integrate the waveguide-coupled resonator in fiber devices or systems.

Figure 10A:
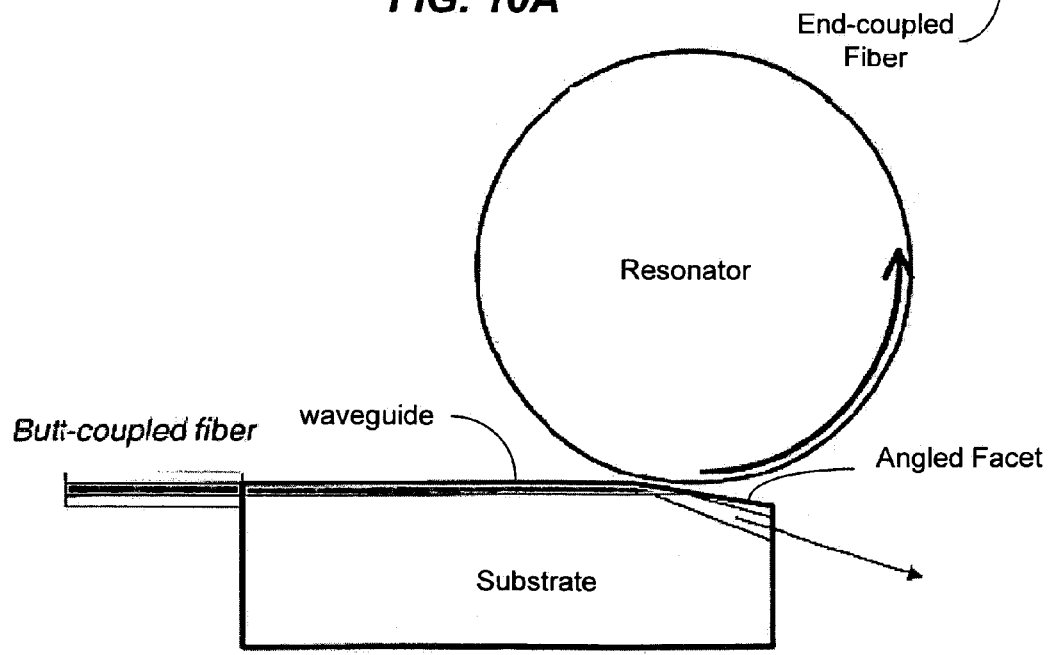
Figure 10B:
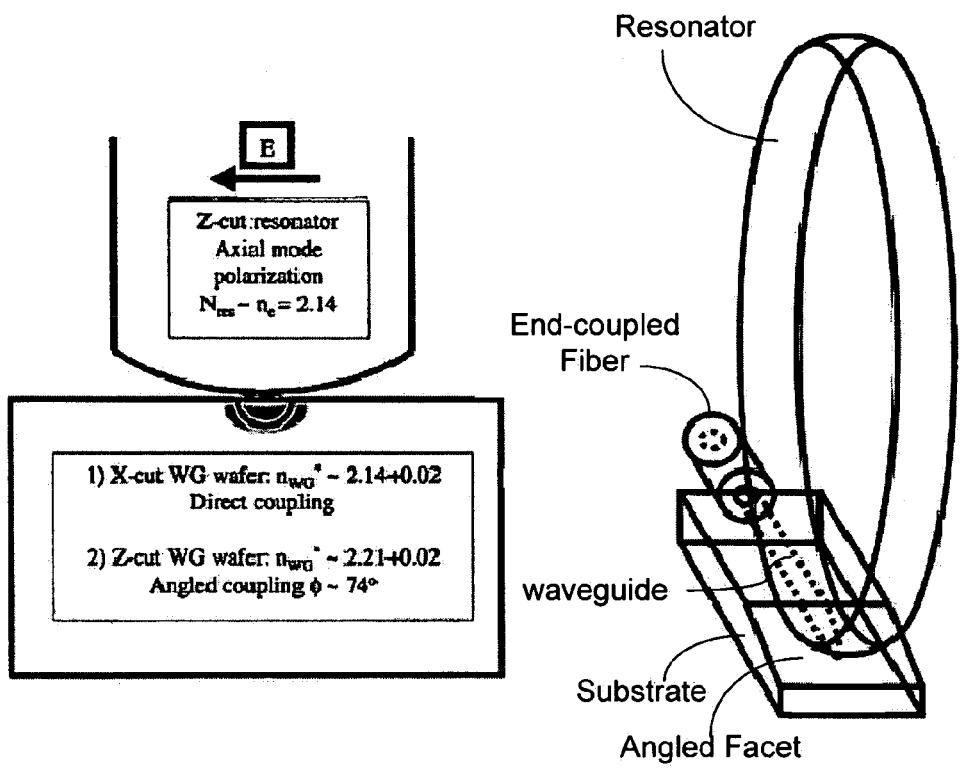
Figure 10C:
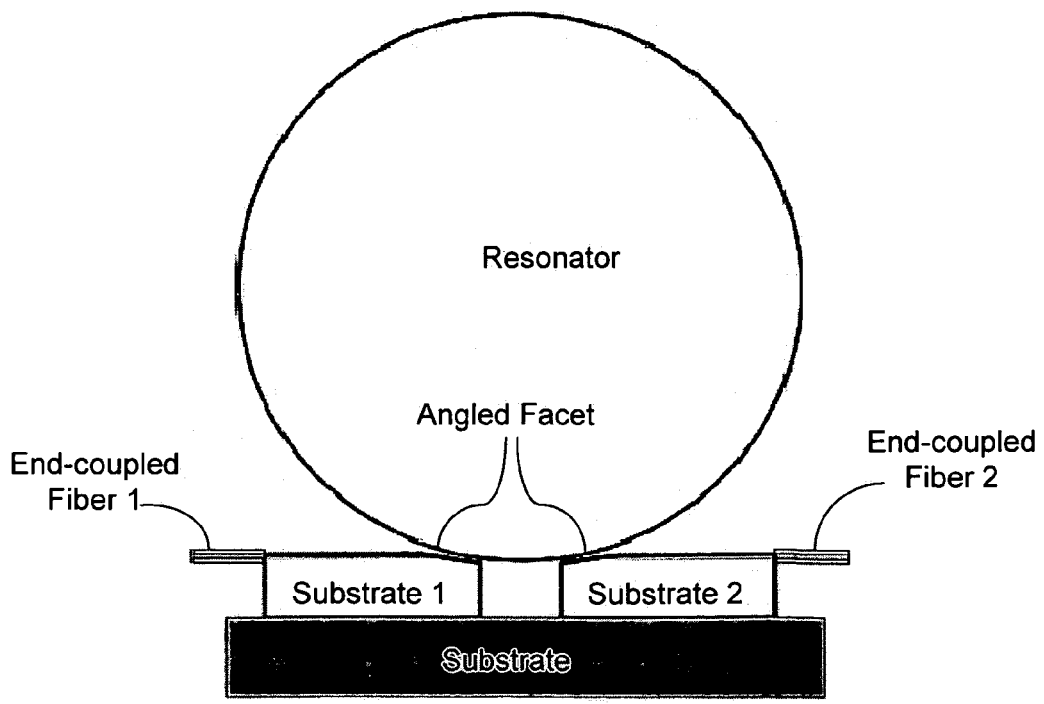

FIGS. 10A and 10B illustrate angled facet coupling for the design in FIG. 7. FIG. 10C further shows that a resonator may be coupled to a first waveguide at its angled facet to receive input light and to a second waveguide at its angled facet to output light. The two waveguides are formed on two separate substrates 1 and 2 which are further supported by a common substrate. Two fibers 1 and 2 may be coupled to the two waveguides, respectively, to provide input and output of light.

The above waveguide couplers may be used in various integrated photonic devices with WGM resonators. Several examples are described below.

Figure 11:
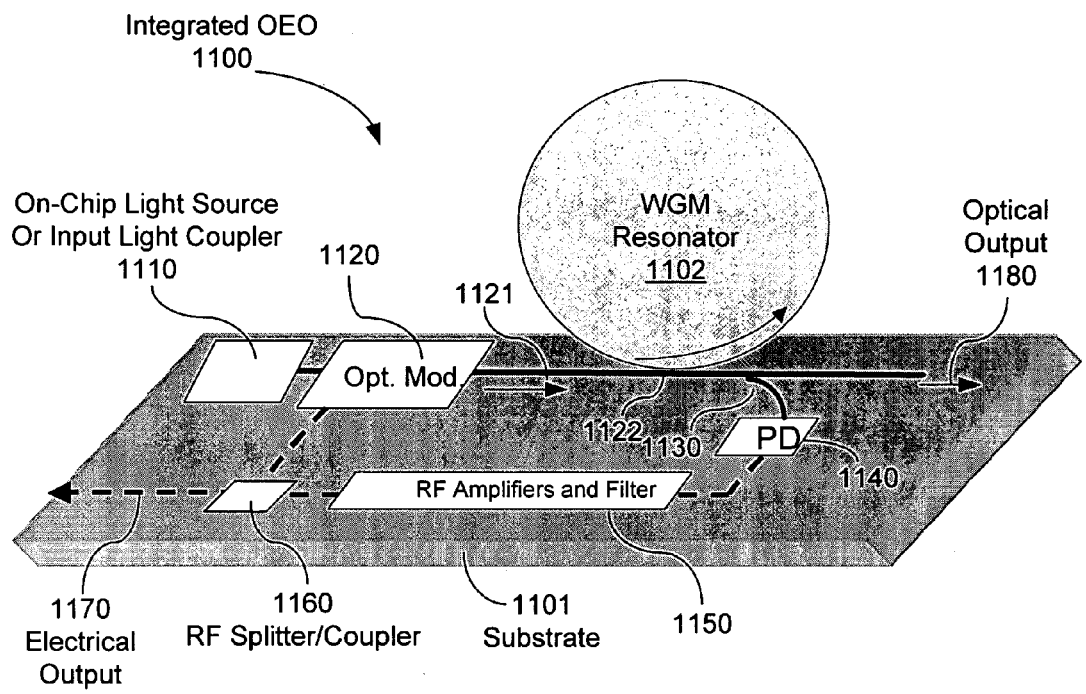
FIGS. 11 and 12 show examples of opto-electronic oscillators that implement a waveguide coupler for coupling with a WGM resonator in the optical section of an opto-electronic feedback loop.
Figure 12:
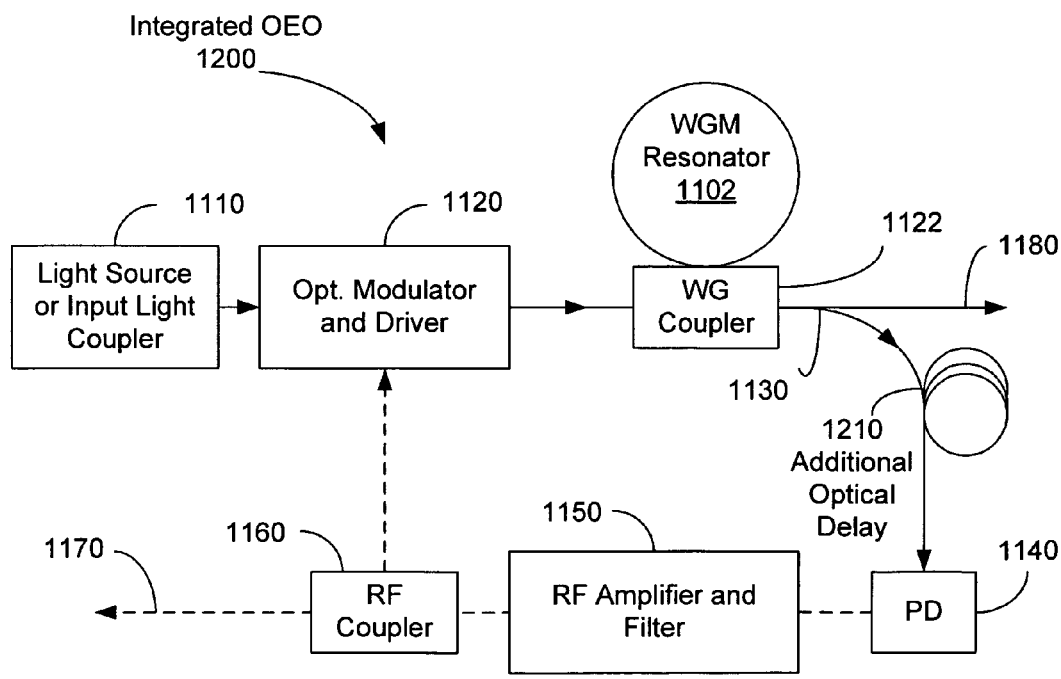

FIGS. 11 and 12 illustrate opto-electronic oscillators (OEO) that implement a pair of the waveguide gratings described above. An OEO may be designed to include at least one closed loop to generate a desired oscillation signal. Some examples of such an OEO are described in, e.g., U.S. Pat. Nos. 5,723,856 to Yao and Maleki, U.S. Pat. No. 5,777,778 to Yao, U.S. Pat. No. 5,929,430 to Yao and Maleki, and U.S. Pat. No. 6,567,436 to Yao, Maleki, and Ilchenko. In these examples, an OEO includes an electrically controllable optical modulator and at least one active opto-electronic feedback loop that comprises an optical part and an electrical part interconnected by a photodetector. The opto-electronic feedback loop receives the modulated optical output from the modulator and converted it into an electrical signal to control the modulator. The loop produces a desired delay and feeds the electrical signal in phase to the modulator to generate and sustain both optical modulation and electrical oscillation in radio frequency spectrum when the total loop gain of the active opto-electronic loop and any other additional feedback loops exceeds the total loss.

OEOs use optical modulation to produce oscillations in frequency spectral ranges that are outside the optical spectrum, such as in the RF and microwave frequencies. The generated oscillating signals are tunable in frequencies and can have narrow spectral linewidths and low phase noise in comparison with the signals produced by other RF and microwaves oscillators. Notably, the OEOs are optical and electronic hybrid devices and allow for versatile applications.

Notably, a high-Q optical resonator may be disposed in the optical part of the opto-electronic feedback loop or in another optical feedback loop coupled to the opto-electronic feedback loop, to provide a sufficiently long energy storage time and an optical filtering mechanism to produce an oscillation of a narrow linewidth and low phase noise. The mode spacing of the optical resonator is equal to one mode spacing, or a multiplicity of the mode spacing, of the opto-electronic feedback loop. In addition, the oscillating frequency of the OEO is equal to one mode spacing or a multiple of the mode spacing of the optical resonator. The above cited U.S. Pat. No. 6,567,436 describes examples of OEOs with at least one optical resonator in the optical part of the opto-electronic feedback loop. The optical resonator may be implemented a WGM resonator such as microsphere, microdisk, and microring WGM resonators. Non-spherical WGM resonators may be used.

FIG. 11 shows an integrated OEO 1100 where the OEO feedback loop is built on a substrate 1101 and a WGM resonator in the optical section of the feedback loop is placed above the substrate 1101 and is optically coupled to the optical section of the loop via a waveguide coupler 1122 based on the direct waveguide coupling design in FIGS. 5 and 6 or the waveguide coupler with two waveguides each having angled facets in FIG. 10C. An optical modulator and its on-chip driver 1120 are used to receive CW input light from an on-chip light source (e.g., a diode laser) or an input light coupler 1110. A waveguide optical coupler 1130 is coupled to the output waveguide 520 to direct a portion of light to a photodetector 1140 on the substrate 1101. The output waveguide directs the rest of light as the optical output 1180 for the OEO 1100. An electronic RF feedback block 1150, which may include RF amplification and filtering, is used to send the output of the detector 1140 to a signal coupler 1160. The coupler 1160 directs a portion of the signal as the electrical output 1170 of the OEO 1100 and feeds the rest of the signal as a modulation feedback control signal to the optical modulator 1120.

FIG. 12 shows an OEO based on the COEO 110 with an additional optical delay 1210 between the coupler 1130 and the photodetector 1140. The additional optical delay 1210 may be another optical resonator or a fiber delay loop. In other implementations, more than one OEO feedback loop may be integrated in FIGS. 11 and 12. The substrate 1101 may be a Si or silicon-on-insulator substrate so that the feedback loop may be fabricated by using silicon fabrication techniques such as CMOS fabrication. Therefore, all components may be made by using the silicon CMOS technology and the RF circuits and the optics are integrated on the same chip. The photodetector may be a monolithically integrated detector.

FIG. 13 shows an example of an optical modulator 1300 that uses a WGM resonator 1310 which exhibits an electro-optic effect. Examples of the suitable materials for the electro-optic effect include but are not limited to an electro-optic crystal such as Lithium Niobate and semiconductor multiple quantum well structures. The index of the resonator 1310 in the path of the WG modes is modulated via the electro-optic effect to change the total optical delay in the resonator so that the operation changes between a resonance condition and a non-resonance condition. The initial value of the optical delay (i.e. detuning from resonance) may be biased at a value where a change in the phase delay produces the maximum change in the output energy. An external electrical signal is used to modulate the optical phase in the resonator to shift the whispering-gallery mode condition and hence the output coupling. Such an optical modulator can operate at a low operating voltage, in the millivolt range. This can achieve a high modulation speed at tens of gigahertz or higher, and have a compact package. The optical coupling with the resonator may be implemented with waveguides or fibers for integration with other fiber optical elements or integrated electro-optical circuits formed on substrates. Hence, such optical modulators may be used in a variety of applications having optical modulation, including optical communication and optical signal processing.

In the modulator 1300 in FIG. 13, a waveguide coupler isbe used for coupling CW light into the electro-optic WGM resonator 1310 and producing a modulated output. A CW light source 1301 may be used to produce the CW light for modulation. An electrode coupler 1320 is disposed near the resonator 1310 to couple an electrical modulation control signal to cause a change in the dielectric constant due to the electro-optic effect. An electronic driving circuit 1330 is coupled to supply the modulation control signal to the electrical coupler 1320.

FIGS. 14A and 14B show one implementation of the electrode coupler 1320. Electrodes 1410 and 1420 may be formed on the resonator 1310 to apply the control electrical field in the region where the WG modes are present to control the index of the electro-optical material The electrodes 1410 and 1420 may be strip electrodes to form a RF or microwave (MW) resonator so that the electrical and the optical field co-exist in the optical path of the WG modes.

The optical modulator in FIG. 13 may also be operated as an optical frequency comb generator. The optical modulation produces multiple modulation sidebands that are the comb in the frequency domain. Such modulated light is then coupled as the pulsed optical output. This comb generator uses the electro-optic WGM resonator modulator outside the laser resonator in the laser 1301. The comb generator can produce a comb of optical harmonics due to the electro-optic modulation. Different from conventional WGM resonators, the WGM resonator 1310 in the device provides special features. First, WG modes of the WGM resonator 1310 have a high finesse. Second, the geometrical dispersion introduced by the cavity structure is generally small compared with the material dispersion. Therefore, the number of harmonics produced by the modulation in WGM resonator 1310 may be as large as in a Fabry-Perot resonator with a conventional electro-optic modulator inside.

Figure 15:
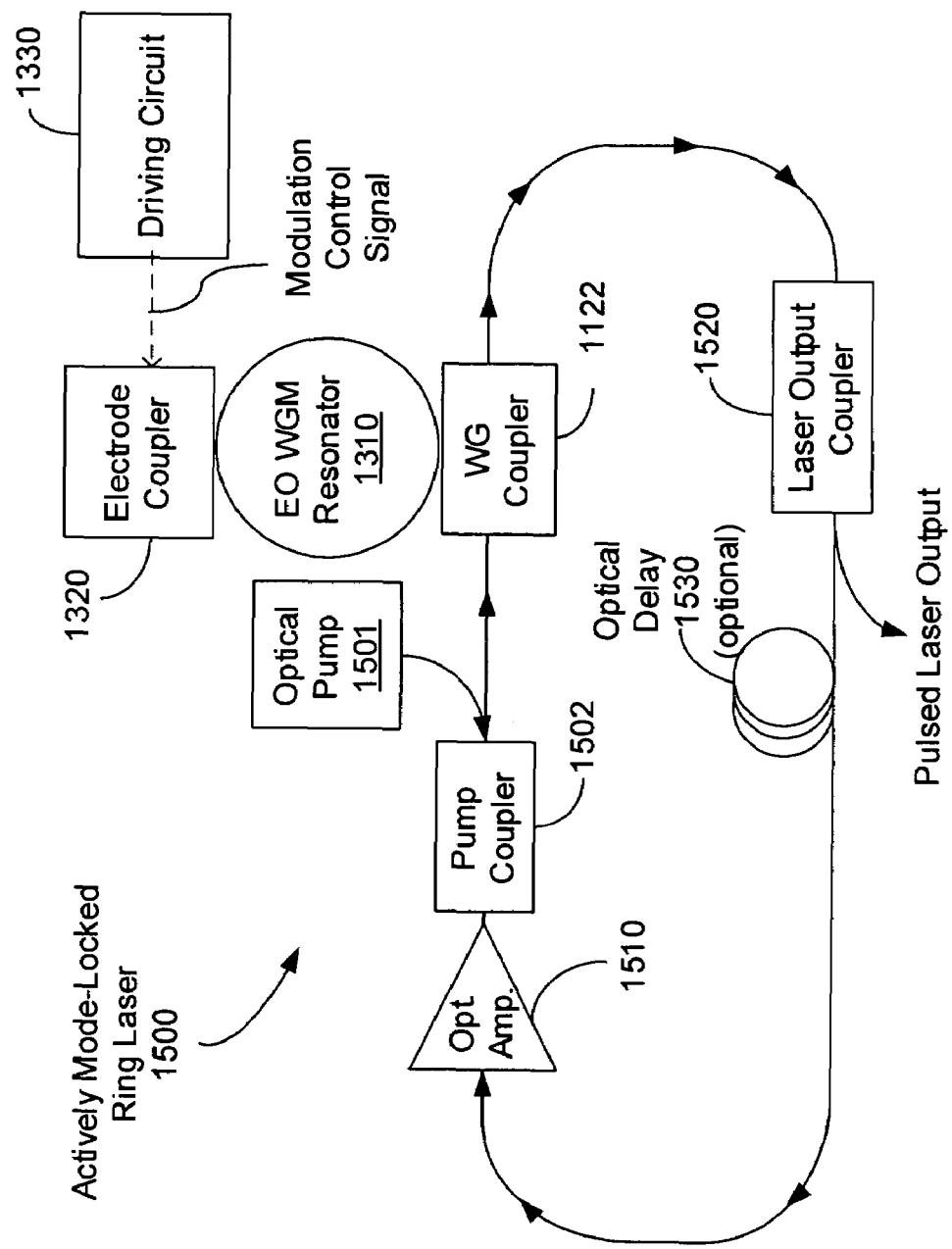
FIGS. 15, 16, 17, and 18 show exemplary applications of an electro-optic WGM resonator and a waveguide coupler in actively mode-locked lasers, coupled opto-electronic oscillators, and tunable optical filtering.

FIG. 15 shows an exemplary actively mode-locked ring laser 1500 having a closed optical ring and an optical amplifier 1510 in the ring. The optical amplifier 1510 may be an electrically-energized semiconductor optical amplifier or an optically-pumped optical amplifier. The illustrated implementation of the amplifier 1510 for the ring laser 1500 is an optically pumped laser gain medium such as an Er-doped waveguide optical amplifier (EDFA) for absorbing pump light at a pump wavelength to produce laser gain at a laser wavelength. A wavelength-selective optical coupler 1502 is coupled near the amplifier 1510 to inject a pump beam at the pump wavelength from a pump light source 1501 into the ring to pump the amplifier 1510. The ring may be a waveguide ring on a substrate. The length of the ring may be set to achieve a desired total cavity length or optical delay for the laser 1500. The laser 1500 implements the electro-optic WGM resonator modulator shown in FIG. 13 to achieve desired active mode locking. The WGM modulator can improve performance of the actively mode locked laser because it can produce significant modulation with low power microwave pump at very high microwave frequencies. Notably, the WGM modulator not only modulates light but also operates as an intracavity etalon within the ring cavity to select the proper mode or modes to oscillate in the ring. A laser output coupler 1520 is coupled in the ring to produce the pulsed laser output. The resonator 1310 further operates an optical delay in the ring laser 1500. An additional optical delay 1530 may be coupled in the ring to provide additional delay. Another passive WGM resonator may be used in the delay 1530.

Figure 16:
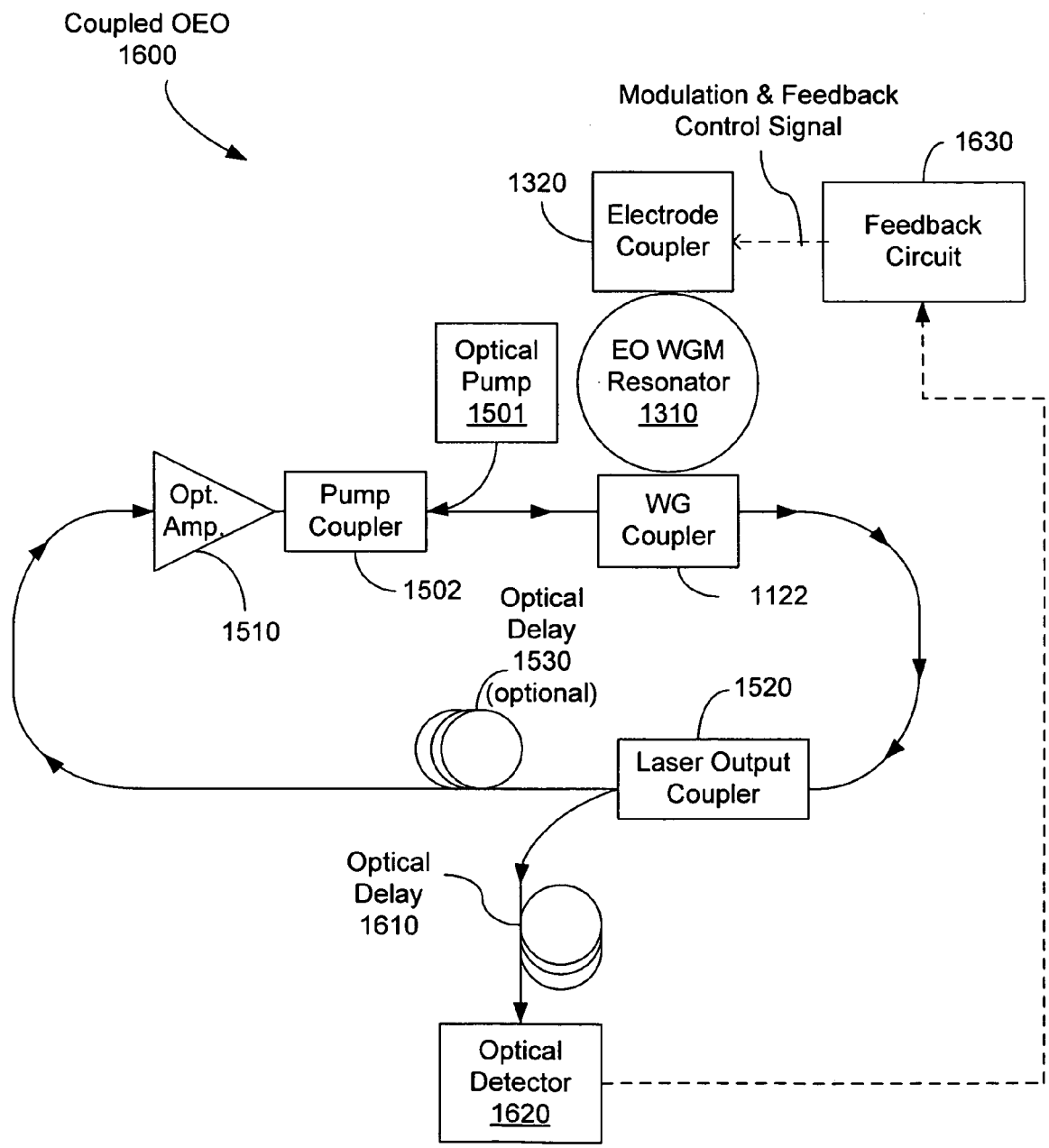

FIG. 16 shows an example of a coupled opto-electronic oscillator (COEO) 1600 having an electro-optic WGM resonator modulator 1310. Examples of COEOs and their operations are described in U.S. Pat. Nos. 5,929,430 and 6,567, 436. In general, a COEO directly couples a laser oscillation in an optical feedback loop or a laser cavity to an electrical oscillation in an opto-electronic feedback loop. The opto-electronic loop generally includes an optical section and an electronic section that are interconnected by an optical detector. The optical section may be used to provide a long loop delay that effectively suppress the phase noise in the oscillation signals. Such a long optical delay may be difficult to achieve electronically. The open loop gain for the opto-electronic loop is greater than the corresponding loss so an oscillation can be generated and sustained in the opto-electronic loop. The laser oscillation and the electrical oscillation are correlated with each other so that both the modes and stability of one oscillation are coupled with those of the other oscillation. The optical feedback loop or the laser cavity includes a gain medium to produce a loop gain greater than the optical loss in the laser cavity to effectuate and sustain the laser oscillation. This optical loop may be implemented by an optical resonator. The coupling between two feedback loops is achieved by controlling the loop gain of the optical loop by an electrical signal generated by the opto-electronic feedback loop. COEOs can achieve a single-mode RF or microwave oscillation without a RF or microwave bandpass filter or any additional opto-electronic feedback loops.

The coupled OEO 1600 in FIG. 16 has two coupled oscillating loops. The first oscillating loop is a laser ring loop similar to what is described in FIG. 15. The electro-optic resonator 1310 is used as the optical modulator for actively mode locking in the laser ring. In the ring, the total gain at the laser wavelength exceeds the optical loss so the laser oscillation at the laser wavelength can be generated and sustained. A second oscillation loop in FIG. 1600 is formed by at least the resonator modulator 1310, the waveguide grating coupler, the coupler 1520, an optional optical delay element 1610, an optical detector 1620, an electrical feedback circuit 1630 (e.g., RF amplification and filtering), and the electrode coupler 1320. This second oscillating loop also has a loop gain greater than the total loss in the loop to generate and sustain an oscillation at the modulation frequency of the modulator 1310. The optional optical delay element 1610 may be an optical resonator such as a passive WGM resonator. These two oscillating loops are coupled to each other by the modulator 1310. This coupling is used here to achieve a compact actively mode-locked laser with high pulse repetition rate by generating the stable RF or microwave modulation signal through the opto-electronic loop. The transformation of the modulated light power into the RF or microwave signal is achieved via the photodetector 1620. Hence, the laser light energy is converted directly to spectrally pure RF or microwave signals, using an electro-optic feedback loop containing a high-Q optical element, at a frequency limited only by the available optical modulation and detection elements. This frequency is the repetition frequency of the optical pulses generated in the system.

Figure 17:
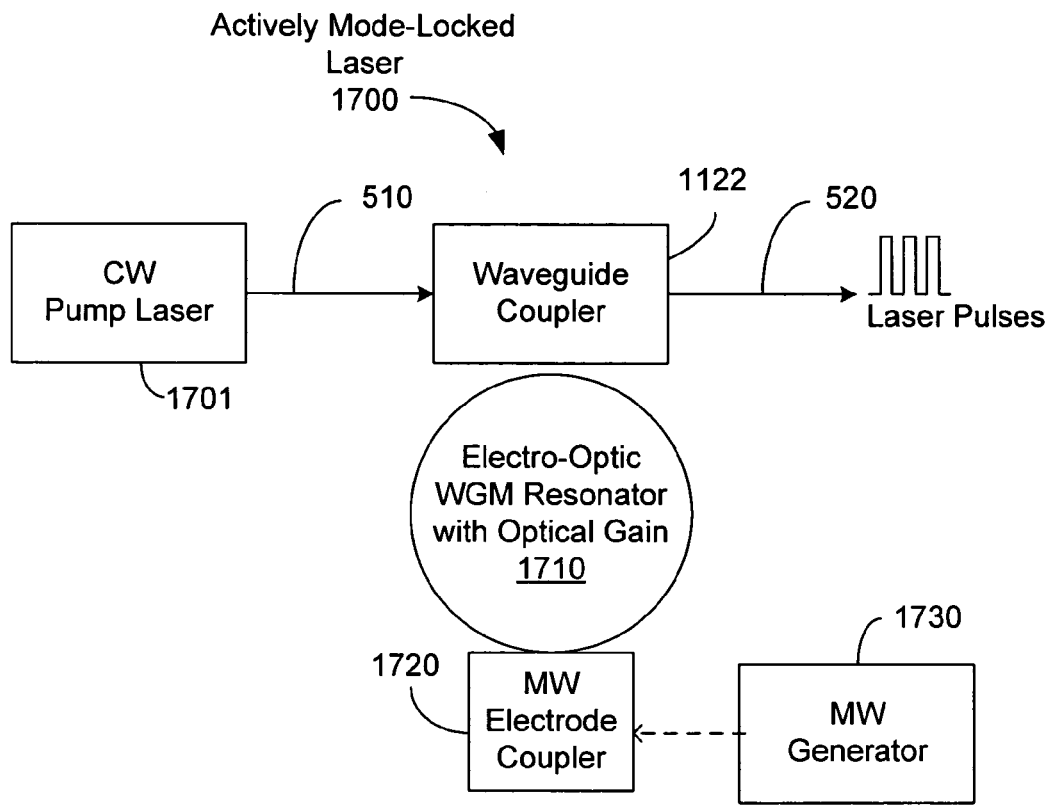

FIG. 17 shows one implementation of an active mode-locked laser 1700 using an electro-optic WGM resonator 1710 as both the modulator and the laser cavity. The WGM resonator 1710 produces both an electro-optic effect for active mode locking and an optical gain under proper optical pumping. In one implementation, the material for the WGM resonator may be an electro-optic material doped with active ions to produce the desired laser gain, such as Er-doped LiNbO3 crystals. In another implementation, the resonator 1710 may include a resonator core made from an electro-optic material and a thin active medium laser formed over the core with a thickness comparable to the volume occupied by the optical WGM modes for the laser light and the pump light. This design allows for separate selection of the electro-optic material and the laser gain material. For example, erbium-doped solgel films may be applied to the surface of lithium niobate cavity to create low-threshold microcavity mode-locked lasers. Silica microsphere lasers with applied solgel films were demonstrated. See, Yang et al., "Gain functionlization of silica microresonators," Optics Letters, Vol. 28, No. 8, pages 592-594 (April, 2003). In such a coated resonator 1710 for the laser 1700, the solgel generally does not reduce the quality factor of the microcavity significantly, while the erbium ions are coupled to the cavity modes via evanescent field.

The WGM resonator 1710 is optically pumped by a pump beam at a desired pump wavelength based on the active ions doped in the resonator material. A pump light source 1701 such as a laser is used to produce the optical pump beam. The resonator 1710 produces the optical gain at a laser wavelength, usually longer than the pump wavelength. The light at the laser wavelength generated by the active ions circulates and accumulates inside the resonator 1710 to build up laser oscillation in one or more WGM modes at the laser wavelength. The laser 1700 also includes electrodes 1720 to supple an electrical modulation signal from a control circuit 1730 such as a microwave signal generator. In operation, the modulation frequency of the signal from the control 1730 is tuned to a desired frequency to lock the laser modes. After the mode locking is established, the laser output 703 becomes laser pulses with a high pulse repetition rate.

Figure 18:
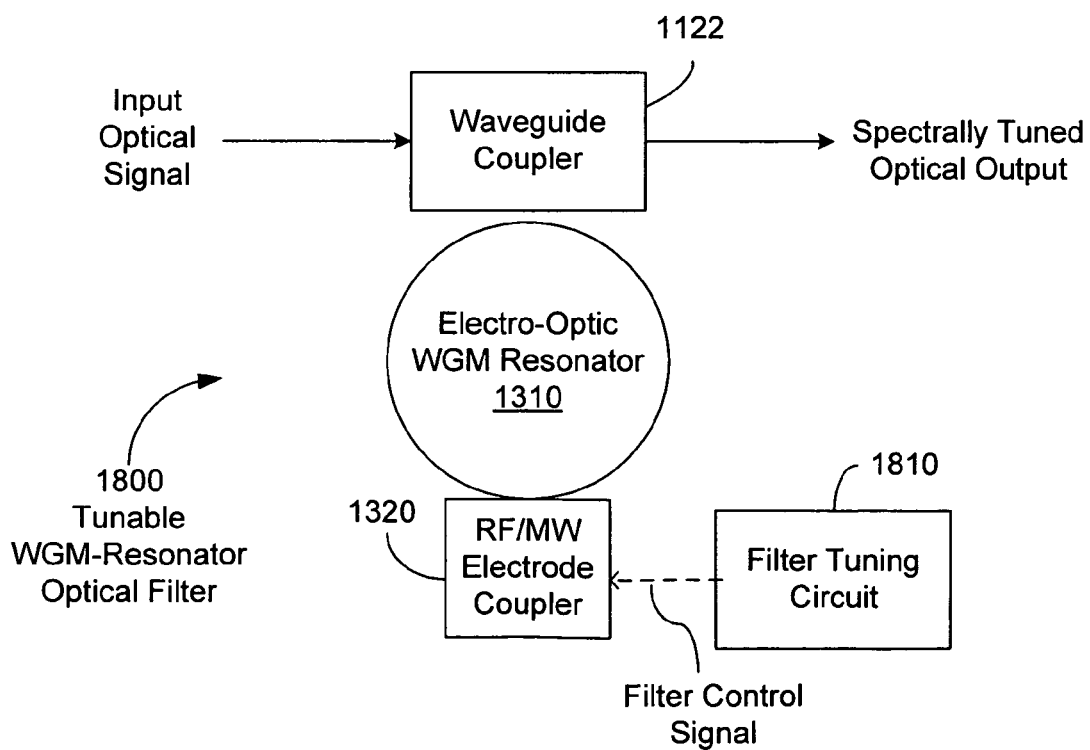

FIG. 18 further shows a tunable optical filter 1800 based on an electro-optic WGM resonator 1310 shown in FIG. 13. The electro-optic material for the entire or part of the resonator 1310 may be any suitable material, including an electro-optic crystal such as Lithium Niobate and semiconductor multiple quantum well structures. An electrode coupler 1320 may be formed on the resonator 1310 to apply a control electrical field in at least the region where the WG modes are present to control the index of the electro-optical material and to change the filter function of the resonator. In one implementation, the electrodes in the coupler 1320 may constitute an RF or microwave resonator to apply the RF or microwave signal to co-propagate along with the desired optical WG mode. A filter tuning circuit 1810 may be used to supply the electrical control signal.

In operating the filter 1800, the filter control unit 1810 may supply a voltage as the electrical control signal to the electrodes in the coupler 1320. In some operations, the control voltage may be a DC voltage to bias the transmission peak of the filter 1800 at a desired spectral location. The DC voltage may be adjusted by the control unit 1810 to tune the spectral position of the transmission peak when such tuning is needed. For dynamic tuning operations, the control unit 1810 adjusts the control voltage in response to a control signal to, e.g., maintain the transmission peak at a desired spectral position or frequency or to change the frequency of the transmission peak to a target position. In some other operations, the control unit 1810 may adjust the control voltage in a time varying manner, e.g., scanning the transmission peak at a fixed or varying speed or constantly changing the transmission peak in a predetermined manner.

In the above WGM resonators, the material for a WGM resonator may be uniform. In such resonators, the resonator dispersion increases as the resonator size decreases. This increased resonator dispersion in turn causes the unequal spectral separation between adjacent modes to increase. This undesired feature is rooted in the fact that the radial distribution of whispering-gallery resonant modes is dependent on the frequency of light in the WG modes. Higher frequency modes propagate on paths that are slightly closer to the surface than those of lower-frequency modes. Thus higher-frequency modes travel in trajectories of a slightly larger radius and slightly longer optical path lengths.

The optical path length of a mode by definition is a function of both the physical distance and the refractive index in the physical path of light. The WGM resonators may use a graded refractive index to modify both the refractive index and the physical location of a WG mode to produce optical spectra of WG modes that are different from the optical spectra produced by WGM resonators with uniform refractive indices. The graded refractive index is specially designed in order to produce mode spacings that are equal or substantially equal for different WG modes. In addition, the graded refractive index of such a WGM resonator may be designed to change the spatial confinement of the WG modes by shifting the spatial distribution of each WG mode away from the exterior surface of the resonator towards the interior of the resonator. Accordingly, the mode volumes of WG modes are increased and displaced away from the exterior surface of the resonator. This spatial shift in the mode location may be used to reduce the overall optical loss at the exterior surface caused by adverse effects of surface contamination and roughness and to achieve a high Q value closer to the high Q value of the resonator under ideal conditions. Furthermore, with the modal field being displaced deeper into the interior of the resonator, optimal coupling with an evanescent coupler, such as a prism or an angled-fiber tip, may be achieved by direct physical contact of the coupler with the resonator. This direct contact avoids the technical difficulties associated with maintaining the airgap between the coupler and a WGM resonator made of a dielectric material with a spatially uniform index profile.

The performance and range of applications based on WGM microcavities can be significantly expanded if a method is found to make microresonator modes equally spaced with precision corresponding to a fraction of the resonance bandwidth of a WGM resonator. Such a dielectric microresonator with an equidistant mode spectrum is similar to the spectrum of a typical Fabry-Perot resonator formed with two reflective mirrors. Such dielectric resonators with an equidistant spectrum may be used, for example, in frequency comb generators, optical pulse generators, broadband energy-storage circuits of electro-optical devices, and in other applications where conventional optical Fabry-Perot cavities are utilized.

This requirement of a gap can be problematic in device design and manufacture because the gap must be maintained at a critical angle and with a critical distance.

The WGM resonators with graded indices may be designed with a spatial gradient profile for the refractive index to shift the WG modes away from the exterior surface towards the interior of the resonator so that the optical coupler in direct contact with the exterior surface can be used to achieve the critical coupling condition without the air gap. In addition, this shift of the WG modes can also reduce optical loss caused by the scattering and absorption by the imperfections and contaminants on the exterior surface of the resonator. This reduced loss leads to high values in the Q factor.

The graded index profile for the WGM resonators, like the geometrical shapes of the resonators, may also have axially or cylindrically symmetric spatial profiles with respect to the same axis 101 (z). According to one implementation, the graded index profile of such a WGM resonator should at least vary along the radial direction, i.e., $n=n(r)$ where $r=(x^2+y^2)^{1/2}$. This radial profile $n(r)$ may have different configurations. In one configuration, for example, the index changes with r throughout the entire resonator from the most inner part where r is at its minimum to the exterior surface where r is at its maximum at each given z within the resonator. The graded index is used here to modify the WG modes and thus it may suffice to have the graded profile only at the outer portion of the resonator because the WG modes are centered near the exterior surface of the resonator. Therefore, in another exemplary configuration, the index may be set at a predetermined constant $n_o$ along the radial direction at the inner part of the resonator but have a radial variation at the outer part of the resonator: $n=n_o+n_r(r)$, where $n_r(r)=0$ when $r<r_o$ and varies with r when $r \geq r_o$. The $r_o$ and the gradient function $n_r(r)$ are selected to place the center of each WG mode where the mode strength is maximum at a desired location away from the exterior surface.

In general, the graded index $n(r)$ or the gradient portion $n_r(r)$ decreases as r increases in order to place the center of each WG mode away from the exterior surface of the resonator. In other applications such as sensing based on WGM resonators, the graded index $n(r)$ or the gradient portion $n_r(r)$ increases as r increases. Such graded index design may be implemented in the waveguide-grating coupled WGM resonators and devices using such WGM resonators.

Only a few implementations are disclosed. However, it is understood that variations and enhancements may be made.

What is claimed is what is described and illustrated, including:

1. A device, comprising:
    an optical resonator formed of an electro-optic material and shaped to support a whispering gallery mode circulating in a plane that is perpendicular to a crystal axis of the electro-optic material; and
    a waveguide formed of the electro-optic material having a crystal axis perpendicular to a longitudinal direction of the waveguide and parallel to the crystal axis of the optical resonator, the waveguide located close to the resonator to evanescently couple with the optical resonator.

2. A device as in claim 1, wherein the optical resonator is a lithium niobate micro resonator.

3. A device as in claim 1, wherein the optical resonator comprises at least a portion of a spheroid.

4. A device as in claim 1, wherein the optical resonator comprises at least a portion of a sphere.

5. A device as in claim 1, wherein the optical resonator is a disk.

6. A device as in claim 1, wherein the optical resonator is a ring.

7. A device as in claim 1, further comprising a fiber coupled to an end facet of the waveguide.

8. A device, comprising:
    an optical resonator formed of an electro-optic material and shaped to support a whispering gallery mode circulating in a plane that is perpendicular to a crystal axis of the electro-optic material; and
    a waveguide formed of the electro-optic material having a crystal axis perpendicular to a longitudinal direction of the waveguide and perpendicular to the crystal axis of the optical resonator, the waveguide having an angled facet at a first end which is located close to the resonator to evanescently couple with the optical resonator.

9. A device as in claim 8, wherein the optical resonator is a lithium niobate micro resonator.

10. A device as in claim 8, wherein the optical resonator comprises at least a portion of a spheroid.

11. A device as in claim 8, wherein the optical resonator comprises at least a portion of a sphere.

12. A device as in claim 8, wherein the optical resonator is a disk.

13. A device as in claim 8, wherein the optical resonator is a ring.

14. A device as in claim 8, wherein the waveguide comprises an end facet at a second end opposite to the first end of the waveguide, the device further comprising a fiber coupled to an end facet at the second end.

15. A device as in claim 14, wherein the waveguide couple input light into the resonator, the device further comprising:
a second waveguide formed of the electro-optic material having a crystal axis perpendicular to a longitudinal direction of the second waveguide and perpendicular to the crystal axis of the optical resonator, the second waveguide having an angled facet which is located close to the resonator to evanescently couple with the optical resonator to couple light out of the resonator.

16. A method, comprising:
providing an optical resonator formed of an electro-optic material with a crystal axis perpendicular to a plane in which a whispering gallery mode of the optical resonator circulates; and
using a waveguide, which is also formed of the electro-optic material, to effectuate a refractive index of guided light to be equal to or greater than a refractive index for the whispering gallery mode in the optical resonator to provide coupling between the optical resonator and the waveguide.

17. A method as in claim 16, further comprising:
making a crystal axis of the waveguide to be parallel to the crystal axis of the optical resonator to match refractive indices of the optical resonator and the waveguide for light coupled therebetween.

18. A method as in claim 16, wherein a crystal axis of the waveguide is perpendicular to the crystal axis of the optical resonator to make the refractive index of the waveguide greater than the refractive index of the optical resonator, the method further comprising:
using an angled facet on the waveguide to couple light polarized along the crystal axis of the optical resonator.

19. A method as in claim 16, further comprising:
coupling an end facet of a fiber to an end facet of the waveguide to direct input light from the fiber into the waveguide.

* * * * *